United States Patent
Li (10) Patent No.: US 12,557,032 B2
(45) Date of Patent: Feb. 17, 2026

(54) METHOD AND APPARATUS FOR SENDING DMRS, AND TERMINAL AND MEDIUM

(71) Applicant: BEIJING XIAOMI MOBILE SOFTWARE CO., LTD., Beijing (CN)

(72) Inventor: Yuanyuan Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 479 days.

(21) Appl. No.: 18/026,315

(22) PCT Filed: Sep. 18, 2020

(86) PCT No.: PCT/CN2020/116235
§ 371 (c)(1),
(2) Date: Mar. 14, 2023

(87) PCT Pub. No.: WO2022/056849
PCT Pub. Date: Mar. 24, 2022

(65) Prior Publication Data
US 2023/0354206 A1    Nov. 2, 2023

(51) Int. Cl.
*H04W 52/14* (2009.01)
*H04J 13/00* (2011.01)
*H04L 5/00* (2006.01)

(52) U.S. Cl.
CPC ....... *H04W 52/146* (2013.01); *H04J 13/0003* (2013.01); *H04L 5/0051* (2013.01)

(58) Field of Classification Search
CPC ........... H04W 72/1268; H04W 52/146; H04W 74/0833; H04W 72/0453; H04W 74/0836;
(Continued)

(56) References Cited

U.S. PATENT DOCUMENTS

2021/0058193 A1*  2/2021  Zhang ................. H04W 52/146

FOREIGN PATENT DOCUMENTS

| CA | 3095835 A1 | 10/2019 |
| CN | 107371225 A | 11/2017 |

(Continued)

OTHER PUBLICATIONS

Indian Patent Application No. 202347026575, Office Action dated Sep. 8, 2023, 5 pages.

(Continued)

*Primary Examiner* — Tu X Nguyen
(74) *Attorney, Agent, or Firm* — Cozen O'Connor (57) ABSTRACT

A method for sending a DMRS is provided. A terminal determines a first sending power for sending a first DMRS on a first frequency resource is based on control information from a network device. The first frequency resource is a frequency resource corresponding to a first CDM group among frequency resources corresponding to a first symbol. The first sending power occupies at least part of a second sending power on a second frequency resource other than the first frequency resources among the frequency resources corresponding to the first symbol. The second frequency resource is not configured for sending a second DMRS. The terminal sends the first DMRS sent by the terminal on the first frequency resource based on the first sending power.

16 Claims, 5 Drawing Sheets

(58) Field of Classification Search
CPC ... H04W 72/046; H04W 80/02; H04W 52/10; H04W 52/08; H04W 52/367; H04W 52/04; H04W 52/38; H04W 52/06; H04W 52/383; H04W 52/34; H04W 52/247; H04W 52/283; H04W 52/0245; H04W 52/226

See application file for complete search history.

(56) References Cited

FOREIGN PATENT DOCUMENTS

| CN | 109150477 A | 1/2019 |
|---|---|---|
| CN | 109511162 A | 3/2019 |
| CN | 109891818 A | 6/2019 |
| EP | 3455994 A1 | 3/2019 |
| WO | WO 2017132957 A | 8/2017 |
| WO | WO 2019193769 A1 | 10/2019 |

OTHER PUBLICATIONS

Chinese Patent Application No. 202080002377.4, Office Action dated Oct. 27, 2022, 9 pages.
Chinese Patent Application No. 202080002377.4, English translation of Office Action dated Oct. 27, 2022, 18 pages.
European Patent Application No. 20953707.5, Search and Opinion dated May 10, 2024, 9 pages.
PCT/CN2020/116235, English translation of Search Report dated Jun. 17, 2021, 3 pages.

* cited by examiner

METHOD AND APPARATUS FOR SENDING DMRS, AND TERMINAL AND MEDIUM

CROSS-REFERENCE TO RELATED APPLICATION

This application is a national phase of International Application No. PCT/CN2020/116235, filed on Sep. 18, 2020, the content of which is hereby incorporated by reference in its entirety.

TECHNICAL FIELD

The disclosure relates to a field of communication technologies, in particular to a method for sending a Demodulation Reference Signal (DMRS), an apparatus for sending a DMRS, a terminal and a medium.

BACKGROUND

In the New Radio (NR) system of wireless communication networks, the Demodulation Reference Signal (DMRS) is mainly used to assist the system to obtain a channel estimation value.

In the related art, frequency resources corresponding to a symbol configured to transmit the DMRS in a time slot are divided in the frequency domain into at least two Code Division Multiplexing (CDM) groups, and the CDM groups are frequency division multiplexed. The frequency resources corresponding to different CDM groups can be occupied by different terminals, and the terminal can send the DMRS through the frequency resource corresponding to the CDM group occupied by itself.

SUMMARY

According to one aspect of the disclosure, a method for sending a DMRS is provided. The method includes:
  determining a first sending power for sending a first DMRS on a first frequency resource based on control information from a network device, in which the first frequency resource is a frequency resource corresponding to a first Code Division Multiplexing (CDM) group among frequency resources corresponding to a first symbol, the first sending power occupies at least part of a second sending power on another frequency resource other than the first frequency resource among the frequency resources corresponding to the first symbol, and the another frequency resource is not configured for sending a second DMRS; and
  sending the first DMRS on the first frequency resource based on the first sending power.

According to one aspect of the disclosure, a method for receiving a Demodulation Reference Signal (DMRS) is provided. The method includes:
  sending control information;
  receiving a first DMRS from a terminal; in which
  the first DMRS is sent by the terminal with a first sending power on a first frequency resource; the first sending power is determined by the terminal based on the control information; the first frequency resource is a frequency resource corresponding to a first Code Division Multiplexing (CDM) group among frequency resources corresponding to a first symbol; the first sending power occupies at least part of a second sending power on another frequency resource other than the first frequency resource among the frequency resources corresponding to the first symbol; and the another frequency resource is not configured for sending a second DMRS.

According to one aspect of the disclosure, a terminal is provided. The terminal includes:
  a processor; and
  a memory for storing instructions executable by the processor; in which
  the processor is configured to load and execute the executable instructions to implement the method for sending a Demodulation Reference Signal (DMRS).

According to one aspect of the disclosure, a network device is provided. The network device includes:
  a processor; and
  a memory for storing instructions executable by the processor; in which
  the processor is configured to load and execute the executable instructions to implement the method for receiving a Demodulation Reference Signal (DMRS).

It is understandable that the above general description and the following detailed description are only examples and illustrations, and cannot limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit the disclosure. The singular forms of "a" and "the" used in the disclosure and appended claims are also intended to include plural forms, unless the context clearly indicates other meanings. It is understandable that the term "and/or" as used herein refers to and includes any or all possible combinations of one or more associated listed items.

It is understandable that although the terms "first", "second", and "third" may be used in this disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the term "if" as used herein can be interpreted as "when", "while" or "in response to determining".

It is understandable that although the steps described in the embodiments of the disclosure are numbered for ease of understanding, these numbers do not represent the order in which the steps are performed, nor does it mean that the sequentially numbered steps must be performed together. It is understandable that one or more steps of the sequentially numbered steps may be performed separately to solve the corresponding technical problems and achieve the desired technical solutions. Although multiple steps are listed together in the accompanying drawings, it does not mean that these steps must be performed together. These steps are listed in the accompanying drawings for ease of understanding.

In the related art, when a terminal sends a Demodulation Reference Signal (DMRS) through a frequency resource corresponding to a Code Division Multiplexing (CDM) group occupied by itself, the frequency resource(s) corresponding to the CDM group(s) occupied by other terminal(s) will be reserved and not used, so as to avoid causing interference to the DMRS sent by other terminal(s). In this way, the terminal can occupy the second sending power allocated on the frequency resource(s) that should be used by other terminal(s) for sending DMRS, so that the sending power for sending the DMRS by the terminal is increased, to facilitate the network device to receive the DMRS and perform channel estimation based on the received DMRS.

However, if the DMRS is sent on the frequency resource corresponding to the CDM group occupied by the terminal itself among the frequency resources corresponding to the symbol configured to transmit the DMRS, and no DMRS is sent by other terminal(s) on other frequency resource(s), the terminal will send data on the other frequency resource(s) and the terminal cannot occupy the second sending power on the other frequency resource(s) to send the DMRS. In this case, in areas with poor coverage quality of the NR system, such as coverage edges of a cell, when the DMRS sent by the terminal reaches the network side, since the receiving power is too low, the network device cannot use the DMRS to perform accurate channel estimation, which affects the system performance.

Therefore, embodiments of the disclosure provide a method for sending a Demodulation Reference Signal (DMRS), an apparatus for sending a DMRS, a terminal and a medium.

In embodiments of the disclosure, a first sending power used in sending a first DMRS by the terminal on a first frequency resource occupies at least part of a second sending power on a second frequency resource other than the first frequency resource among the frequency resources corresponding to a first symbol, and the second frequency resource is not configured for sending the second DMRS. In this case, the first sending power for sending the first DMRS is increased by occupying the at least part of the second sending power on the second frequency resource, so that in areas with poor coverage quality of the NR system, such as the coverage edges of the cell, the network device can receive the first DMRS sent by the terminal with a suitable receiving power and use the first DMRS to perform accurate channel estimation, which improves the system performance.

Figure 1:
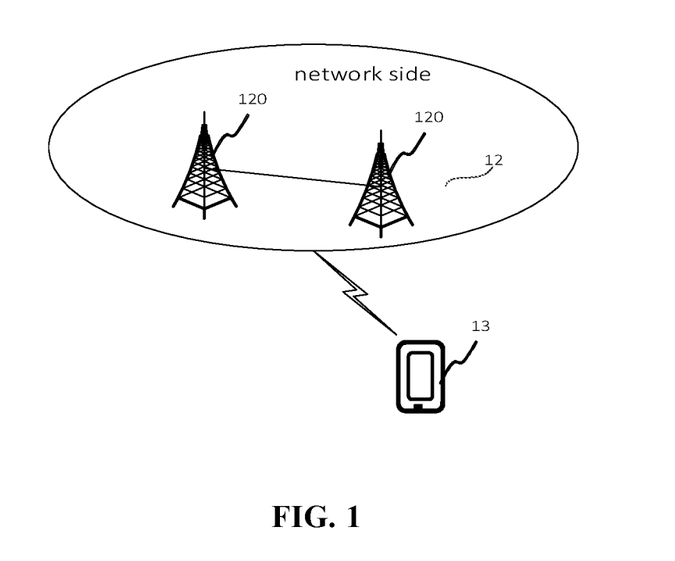
FIG. 1 is a block diagram illustrating a communication system according to some embodiments of the disclosure.

FIG. 1 is a block diagram illustrating a communication system according to some embodiments of the disclosure. As illustrated in FIG. 1, the communication system may include: a network side 12 and a terminal 13.

The network side 12 includes a plurality of network devices 120. The network device 120 may be a base station. The base station is a device deployed in the access network to provide a wireless communication function for the terminal. The base station can be either a base station for a service cell of the terminal 13 or a base station for neighboring cells of the service cell of the terminal 13. The base station may have various forms, such as macro base stations, micro base stations, relay stations, access points, and Transmission Reception Points (TRPs). In a system using different radio access technologies, the name of the device having the functions of the base station may be different, for example, it is called gNodeB or gNB in a 5G NR system. The description of "base station" may change as the communication technology evolves. The network device 120 may also be a Location Management Function (LMF) entity.

The terminal 13 may include a variety of handheld devices with wireless communication capabilities, in-vehicle devices, wearable devices, computing devices or Internet of Things (IoT) devices or Industrial Internet of Things (IIoT) devices or other processing devices connected to a wireless modem, and various forms of user devices, such as Mobile Stations (MSs) and terminal devices. For ease of description, the devices mentioned above are collectively referred to as the terminal. The network device 120 and the terminal 13 communicate with each other via a certain radio interface technology, such as a Uu interface.

The communication system and the business scenarios described in the embodiments of the disclosure are intended to illustrate the technical solutions of the disclosure more clearly, and do not constitute a limitation of the technical solutions provided by this disclosure. It is known to those of ordinary skill in the art that the technical solutions provided by the disclosure are also applicable to similar technical problems as the communication system evolves and new business scenarios emerge.

In order to facilitate understanding of the embodiments, the structure of the DMRS in the NR system is described firstly below.

In the NR system, the DMRS is used for terminal channel estimation and coherent demodulation of the Physical Downlink Shared Channel (PDSCH), and this DMRS is only present in the resource blocks of the PDSCH transmission. Similarly, the DMRS used for Physical Uplink Shared Channel (PUSCH) is used for coherent demodulation of the PUSCH by the network devices. Embodiments of the disclosure are mainly directed to, but are not limited to, the DMRS for the PUSCH.

There are two mapping types for the DMRS in the NR system. Within a time slot, locations of respective first Orthogonal Frequency Division Multiplexing (OFDM) symbols used to transmit the DMRS are different in the two mapping types. These two mapping types are the mapping type A and the mapping type B. For the mapping type A, the first OFDM symbol used to transmit the DMRS is on the second or third OFDM symbol in the time slot. For the mapping type B, the first OFDM symbol used to transmit the DMRS is on the first OFDM symbol used to transmit data.

For different mapping types, the DMRS is further divided into two types: DMRS type 1 and DMRS type 2. Each of these two types includes one OFDM symbol (single-symbol DMRS) or two OFDM symbols (dual-symbol DMRS).

In the following, the mapping type A is used as an example to describe the two types of DMRS separately in combination with FIG. 2 to FIG. 5. For example, FIG. 2 to FIG. 5 each illustrates the structure of a resource block, in which one resource block includes 14 OFDM symbols and 12 subcarriers, and one OFDM symbol and one subcarrier are a Resource Element (RE).

DMRS Type 1

Figure 2:
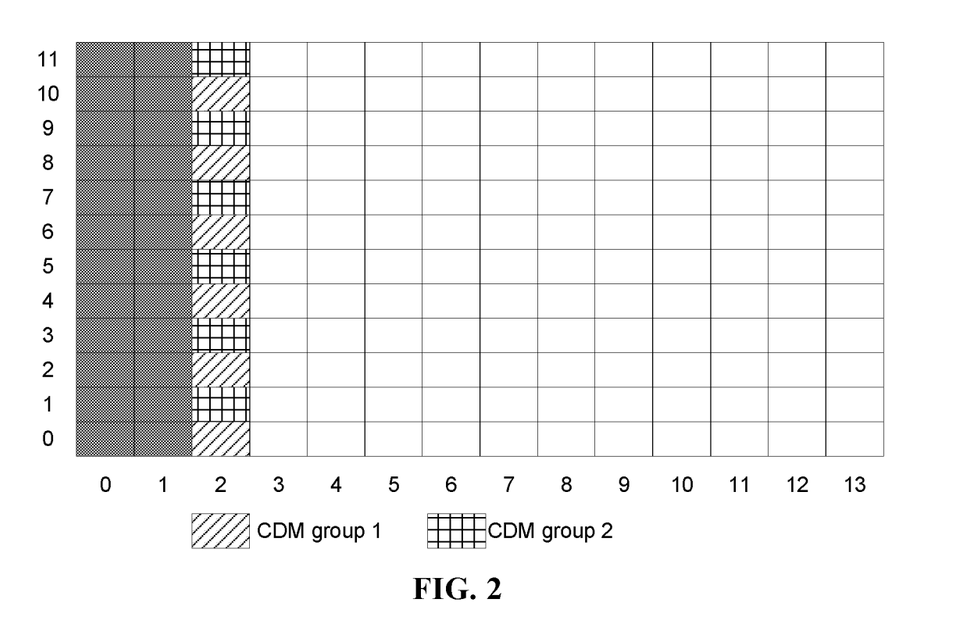
FIG. 2 is a schematic diagram illustrating a DMRS type according to some embodiments of the disclosure.
Figure 3:
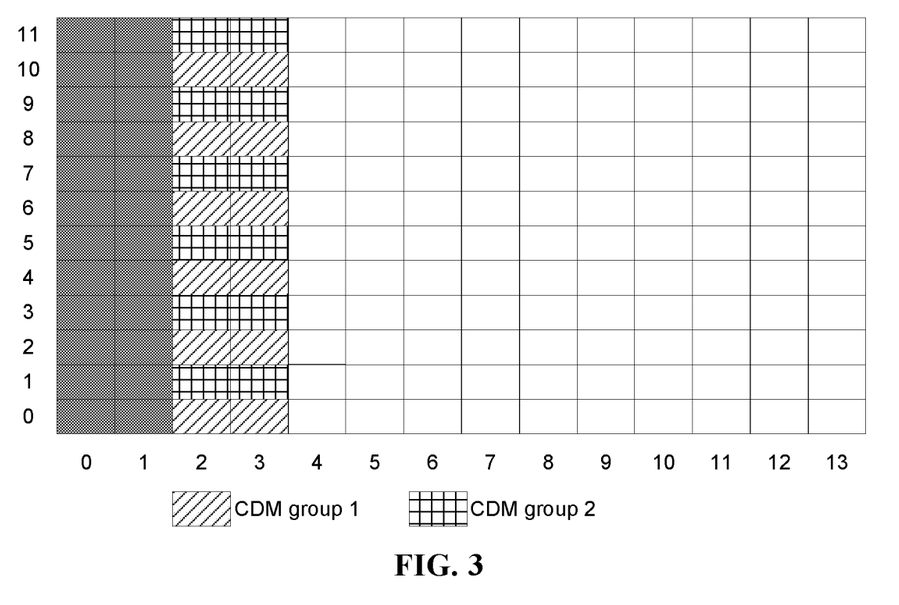
FIG. 3 is a schematic diagram illustrating another DMRS type according to some embodiments of the disclosure.

1) Single-symbol DMRS. The subcarriers within one OFDM symbol are divided into two groups of frequency division comb resources, and each group of comb resources constitutes a Code Division Multiplexing (CDM) group. That is, the frequency resources corresponding to the symbol configured for transmitting the DMRS are divided into two CDM groups. As illustrated in FIG. 2, the subcarriers with even numbers (i.e., 0, 2, 4, 6, 8, and 10) form one CDM group (i.e., the CDM group 1), and the subcarriers with odd numbers (i.e., 1, 3, 5, 7, 9, and 11) form another CDM group (i.e., the CDM group 2). 2-port multiplexing is supported by 2 Orthogonal Cover Codes (OCCs) in the CDM groups, such that at most 4 ports are supported.
2) Dual-symbol DMRS. The CDM groups are divided in the same way as the corresponding division of single-symbol DMRS. Based on the single-symbol DMRS structure, time domain OCC is added. As illustrated in FIG. 3, each CDM group occupies two consecutive OFDM symbols, and each CDM group supports four orthogonal ports through four time-frequency domain OCCs, such that at least 8 ports are supported.

DMRS Type 2

Figure 4:
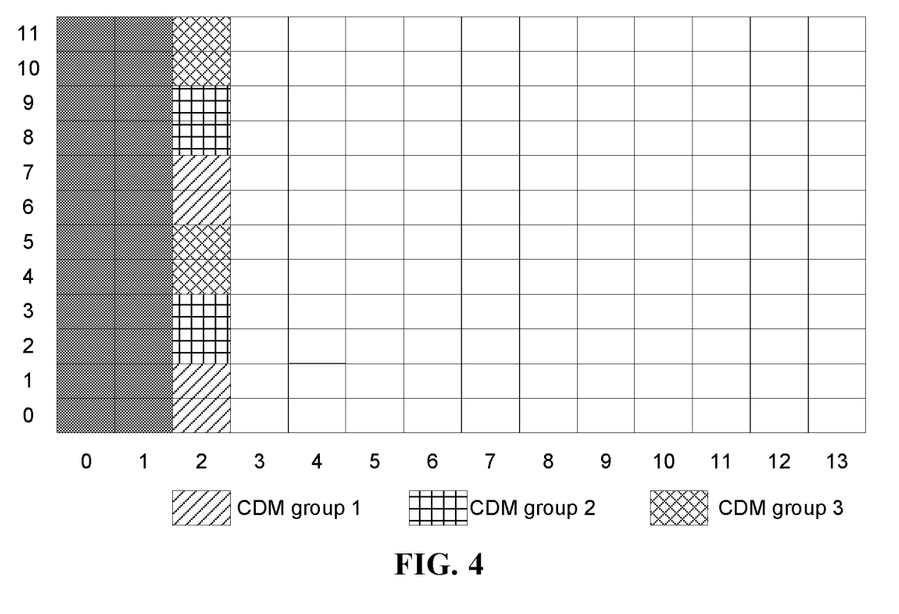
FIG. 4 is a schematic diagram illustrating yet another DMRS type according to some embodiments of the disclosure.
Figure 5:
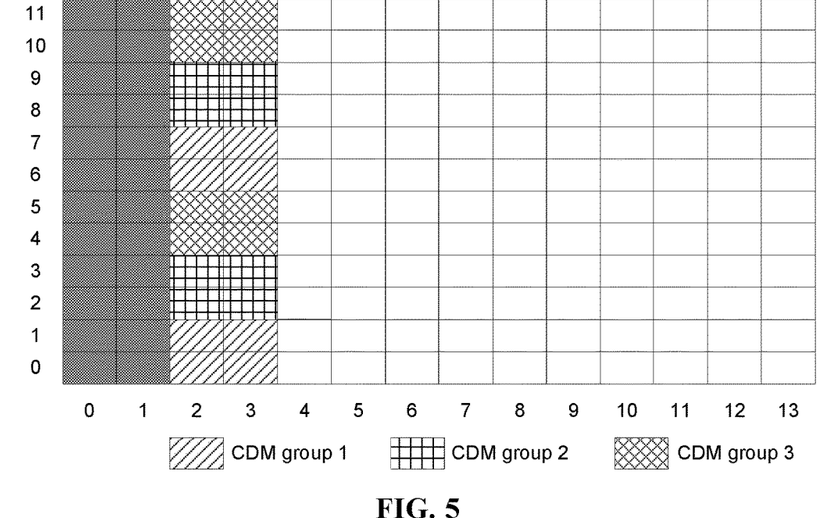
FIG. 5 is a schematic diagram illustrating still another DMRS type according to some embodiments of the disclosure.

1) Single-symbol DMRS. The subcarriers within one OFDM symbol are divided into three CDM groups, and each CDM group consists of two pairs of two adjacent subcarriers. As illustrated in FIG. 4, the subcarriers numbered 0, 1, 6, and 7 form one CDM group (i.e., the CDM group 1), the subcarriers numbered 2, 3, 8, and 9 form another CDM group (i.e., the CDM group 2), and the subcarriers numbered 4, 5, 10, and 11 form still another CDM group (i.e., the CDM group 3). The 2-port multiplexing is supported by 2 OCCs in the CDM groups, and Frequency Division Multiplexing (FDM) is adopted between the CDM groups, such that at most 6 ports are supported.
2) Dual-symbol DMRS. The CDM groups are divided in the same way as the corresponding division of single-symbol DMRS. Based on the single-symbol DMRS structure, the time domain OCC is added. As illustrated in FIG. 5, each CDM group occupies two consecutive OFDM symbols, and three CDM groups support at most 12 ports.

The structure of the DMRS used during transmission is configured by the network device. The network device will send a scheduling command to the terminal to tell the terminal whether a single-symbol DMRS or a dual-symbol DMRS should be used in the transmission, and the scheduling command is also configured to indicate to the terminal which CDM group(s) are used by other terminal(s) to send the DMRS in this scheduled transmission, so that the terminal can avoid, during data mapping, the frequency resources used for sending the DMRS by itself and other terminals. That is, the terminal will reserve and not use the frequency resource(s) corresponding to other CDM group(s), to avoid interference to the DMRS of other terminal(s). In this case, the terminal may occupy at least part of a second sending power on the frequency resource(s) corresponding to the CDM group(s) occupied by other terminal(s), or it may be considered that the terminal borrows power on the frequency resource(s) corresponding to the CDM group(s) occupied by other terminal(s). For example, all or part of the power used for transmitting data on the frequency resource(s) corresponding to the CDM group(s) occupied by other terminal(s) are borrowed by the terminal to send the DMRS, so as to increase the sending power for sending the DMRS.

In a case where other CDM group(s) in the frequency resources corresponding to the symbol used for transmitting the DMRS are not occupied by other terminal(s), the terminal transmits data on the frequency resource(s) corresponding to other CDM group(s). That is, in a case where the frequency resources corresponding to the symbol used for transmitting the DMRS are not all used for sending the DMRS, the terminal transmits data on the frequency resource(s) that are not used for sending the DMRS. In the related art, the terminal uses the same sending power on each RE corresponding to the symbol used for transmitting DMRS. In the areas with good signal coverage quality, for example, the terminal is located in the middle of a cell, the network device can receive the DMRS normally and perform accurate channel estimation. However, in areas with poor signal coverage quality, for example, the terminal is located at the edge of the cell, the network device cannot perform the accurate channel estimation due to weak DMRS signal quality.

Therefore, embodiments of the disclosure provide a method for sending and/or receiving a Demodulation Reference Signal (DMRS), which can improve the sending power for sending the DMRS when the frequency resources corresponding to the symbol used for transmitting DMRS are not all used for sending the DMRS, so that the network device can receive the DMRS well and perform the accurate channel estimation based on the DMRS, to improve the system performance.

Figure 6:
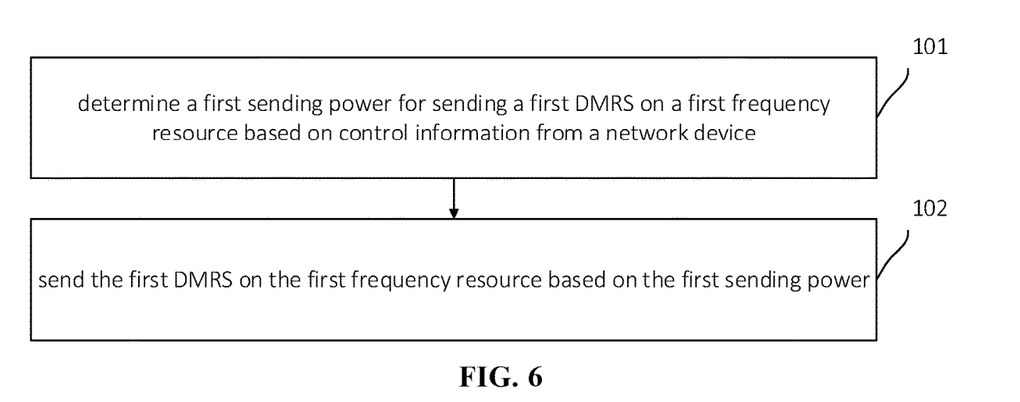
FIG. 6 is a flowchart illustrating a method for sending a DMRS according to some embodiments.

FIG. 6 is a flowchart illustrating a method of sending a DMRS according to some embodiments. The method is performed by a terminal. As illustrated in FIG. 6, the method includes the following.

At step 101, a first sending power for sending a first DMRS on a first frequency resource is determined based on control information from a network device. The first frequency resource is a frequency resource corresponding to a first CDM group among frequency resources corresponding to a first symbol. The first sending power occupies at least part of a second sending power on another frequency resource other than the first frequency resource among the frequency resources corresponding to the first symbol, and the another frequency resource is not configured for sending a second DMRS.

At step 102, the first DMRS is sent on the first frequency resource based on the first sending power.

In some examples, occupying the sending power may be referred to as borrowing the sending power, which means that the initial sending power on the frequency resource corresponding to the CDM group occupied by the terminal is increased by XdB to obtain the first sending power, while the initial sending power (i.e., the second sending power) on the frequency resource other than the frequency resource corresponding to the CDM group occupied by the terminal is decreased by XdB, where X is greater than 0.

In some examples, the control information is configured to instruct the terminal that the first sending power occupies the second sending power on another frequency resource.

In some examples, the control information is configured to indicate a part of a plurality of CDM groups corresponding to the first symbol configured for sending DMRS, in which the first CDM group belongs to the part of the plurality of CDM groups.

For example, the part of the plurality of CDM groups is one CDM group.

In some examples, the first sending power occupies XdB of the second sending power, and X is a default value. That is, the terminal borrows power from the frequency resource(s) corresponding to the unoccupied CDM group(s) based on the default value.

In some examples, X is a configured value configured by the network device. That is, the terminal borrows power from the frequency resource(s) corresponding to the unoccupied CDM group(s) based on the configured value configured by the network device.

In some examples, for the DMRS type 1, the value of X is selected from 0.5, 1, 2, and 3, and for the DMRS type 2, the value of X is selected from 0.5, 1, 2, 3, and 4.77.

In some examples, the default value is a maximum value within a value range of the configured value.

In some examples, the control information includes the configured value.

In a possible implementation, the method further includes:
sending data on frequency resources other than the first frequency resource among the frequency resources corresponding to the first symbol, based on the remaining second sending power obtained after the at least part of the second sending power is occupied.

In another possible implementation, the method further includes:
sending no data on frequency resources other than the first frequency resource among the frequency resources corresponding to the first symbol. For example, no data is mapped on the frequency resources other than the first frequency resource among the frequency resources corresponding to the first symbol.

In some examples, the first sending power is greater than the remaining second sending power obtained after the at least part of the second sending power is occupied.

It is noteworthy that the aforementioned step 101 to step 102 and the above optional steps can be combined arbitrarily.

Figure 7:
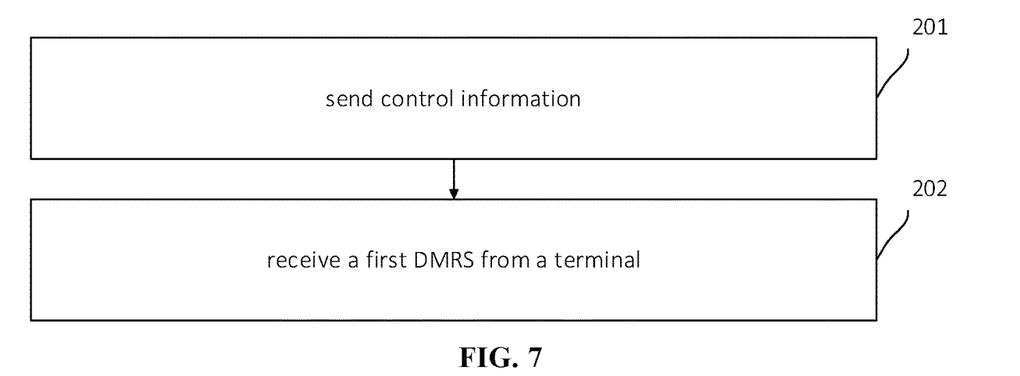
FIG. 7 is a flowchart illustrating a method for receiving a DMRS according to some embodiments.

FIG. 7 is a flowchart illustrating a method of receiving a DMRS according to some embodiments. The method is performed by a network device. As illustrated in FIG. 7, the method includes the following steps.

At step 201, control information is sent.

At step 202, a first DMRS from a terminal is received.

The first DMRS is sent by the terminal with a first sending power on a first frequency resource. The first sending power is determined by the terminal based on the control information. The first frequency resource is a frequency resource corresponding to a first CDM group among frequency resources corresponding to a first symbol. The first sending power occupies at least part of a second sending power on another frequency resource other than the first frequency resource among the frequency resources corresponding to the first symbol. The above another frequency resource is not configured for sending a second DMRS.

In some examples, the first sending power is greater than a remaining second sending power obtained after the at least part of the second sending power is occupied.

The related contents of the occupied sending power and the control information can be seen in the embodiment shown in FIG. 6 and will not be repeated here.

The aforementioned step 201 to step 202 and the above optional steps can be combined arbitrarily.

Figure 8:
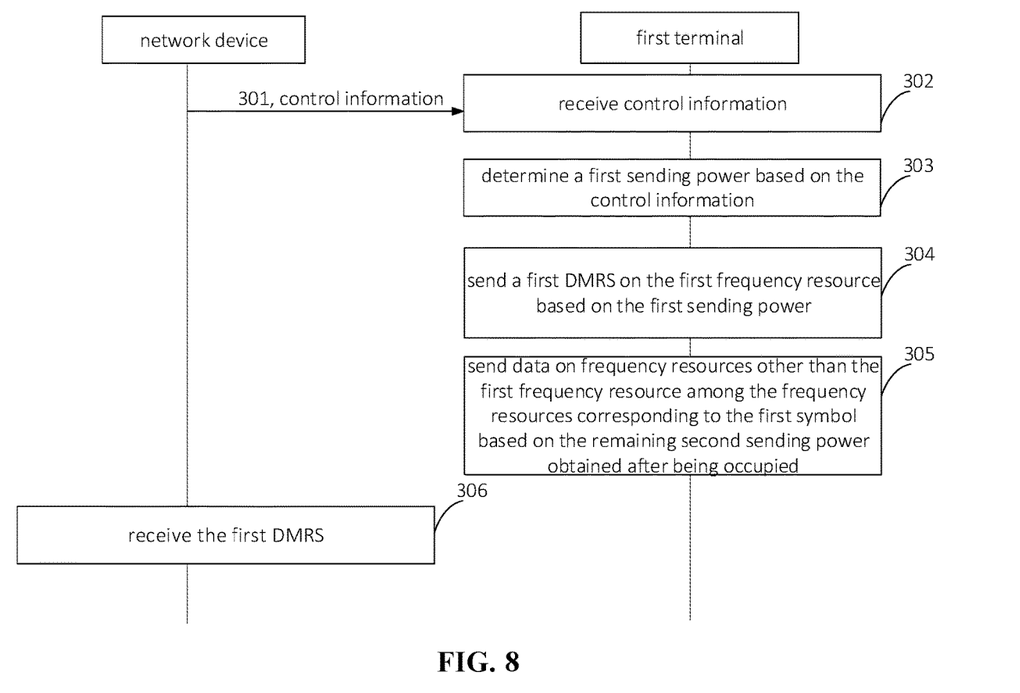
FIG. 8 is a flowchart illustrating a method for transmitting a DMRS according to some embodiments.

FIG. 8 is a flowchart illustrating a method of transmitting a DMRS (i.e. sending and receiving DMRS) according to some embodiments. The method is performed by both the terminal and the network device. As illustrated in FIG. 8, the method includes the following.

At step 301, the network device sends the control information.

In embodiments of the disclosure, the control information is configured to instruct the first terminal to determine the first sending power to occupy at least part of the second sending power. The first sending power is a power used by the first terminal to send the first DMRS on the first frequency resource. The first frequency resource is a frequency resource corresponding to the first CDM group in the frequency resources corresponding to the first symbol. The first CDM group is the CDM group occupied by the first terminal. The second sending power is the sending power on another frequency resource other than the first sending power in the frequency resources corresponding to the first symbol, the another frequency resources is not configured for sending the DMRS, i.e., the CDM group corresponding to the another frequency resource is not allocated for use by any terminal.

In a possible implementation, the control information includes one or more bits. When the one or more bits are the first value, the first terminal is instructed to determine first sending power to occupy the second sending power. When the one or more bits are the second value, the first terminal is instructed to determine the first sending power to not occupy the second sending power. In this way, the first terminal is instructed to determine the first sending power for sending the first DMRS to occupy or not occupy the second sending power.

In a possible implementation, the control information can be used to indicate a part of, not all of, a plurality of CDM groups corresponding to the first symbol configured for sending DMRS, in which the first CDM group belongs to the part of the plurality of CDM groups. If the terminal determines, based on the control information, that only some CDM groups of the plurality of CDM groups corresponding to the first symbol are used to send DMRS, it is determined that the first sending power occupies the second sending power. Otherwise, if the terminal determines, based on the control information, that all of the CDM groups corresponding to the first symbol are configured for sending the DMRS, it is determined that the first sending power does not occupy the second sending power. That is, the first terminal is instructed, by means of implicit indication, whether to occupy or not the second sending power by the determined first sending power for sending the first DMRS.

In some examples, the part of the plurality of CDM groups may be a single CDM group or a plurality of CDM groups. When the part of the plurality of CDM groups are at least two CDM groups, these at least two CDM groups may be occupied by one terminal (e.g. the first terminal), or by at least two terminals.

For example, the part of the plurality of CDM groups may be one CDM group. That is, the first terminal determines the first sending power to occupy the second sending power if only one CDM group of the plurality of CDM groups corresponding to the first symbol is occupied by the first terminal.

In some examples, the control information includes identifier(s) (e.g., serial number(s)) of CDM group(s) occupied by the first terminal and the number of occupied CDM groups.

In a possible implementation, the first terminal can determine whether a part of, not all of, the CDM groups are occupied based on the number of occupied CDM groups and the number of CDM groups corresponding to the first symbol.

For example, the first terminal determines the number of CDM groups corresponding to the first symbol based on the known DMRS type. For example, as previously described, if the DMRS type is the DMRS type 1, the number of CDM groups is 2, and if the DMRS type is the DMRS type 2, the number of CDM groups is 3. The first terminal compares the number of occupied CDM groups in the control information with the number of CDM groups corresponding to the first symbol, and if the number of occupied CDM groups in the control information is less than the number of CDM groups corresponding to the first symbol, the first terminal determines that a part, not all, of the plurality of CDM groups corresponding to the first symbol are occupied, i.e., the part of the plurality of CDM groups are used to send the DMRS.

In another possible implementation, the first terminal determines whether a part of, not all of, CDM groups are occupied based on the number of occupied CDM groups in the control information.

For example, when the first terminal determines that the number of occupied CDM groups in the control information is 1, since the number of CDM groups corresponding to the first symbol is greater than 1, it is determined that the a part of, not all of, CDM groups corresponding to the symbol used to transmit the DMRS are occupied.

In some examples, the control information further includes indication information for indicating the value of the at least part of the second sending power occupied by the first terminal while determining the first sending power, i.e., for indicating the power value that can be borrowed from the second sending power. For example, the second indication information is used to indicate the XdB of the second sending power occupied by the first sending power. In embodiments of the disclosure, the borrowed power value is in unit of dB, i.e., the borrowed power value is a relative value. Therefore, the initial power value can be increased by the borrowed power value.

For example, the indication information is an X value, e.g., 0.5, or 1. Alternatively, the second indication information is an identifier corresponding to the X value, e.g., the second indication information is 0 indicates that the X is 0.5, 1 indicates that the X is 1, 2 indicates that the X is 2, 3 indicates that the X is 3, 4 indicates that the X is 4.77, etc.

In some examples, the indication information includes two information elements, one indicating the X value for the DMRS type 1 and the other indicating the X value for the DMRS type 2.

In some examples, for the DMRS type 1, the value of X is selected from 0.5, 1, 2, and 3, and for the DMRS type 2, the value of X is selected from 0.5, 1, 2, 3, and 4.77.

In some examples, the control information also includes the number of ports occupied by the first terminal.

For example, the control information is Downlink Control Information (DCI).

At step 302, the first terminal receives the control information from the network device.

At step 303, the first terminal determines the first sending power based on the control information.

The first sending power equals to the sum of the initial sending power corresponding to the first frequency resource and the XdB.

In a possible implementation, the control information includes the second indication information, in which the value of X is indicated by the second indication information, i.e., X is a configured value configured by the network device.

In another possible implementation, the control information does not include the second indication information and X is a default value.

For example, when X is the default value, X is the maximum value within a value range of the configured value corresponding to the DMRS type by default. For example, for the DMRS type 1, the default value is 3, and for the DMRS type 2, the default value is 4.77.

The initial sending power is the power used by the terminal to send the first DMRS in the case where the second sending power is not occupied. Embodiments of the disclosure do not limit the way in which the initial power value is determined, such as a default value or a value determined according to a preset algorithm or rule.

At step 304, the first terminal sends the first DMRS on the first frequency resource based on the first sending power.

At step 305, the first terminal sends data on frequency resources other than the first frequency resource among the frequency resources corresponding to the first symbol based on a remaining second sending power obtained after the at least part of the second sending power is occupied.

That is, the first terminal maps the data on the RE corresponding to the other frequency resources and sends that data with the second sending power.

In embodiments of the disclosure, the occupied power value is a relative value. In the related art, the first terminal carries the first DMRS on the RE corresponding to the CDM group occupied by the first terminal, maps data on the RE corresponding to the unoccupied CDM group(s), and sends, with the same power, the first DMRS and data carried in the first symbol. Assuming that the first terminal sends, with 10 dBm, the first DMRS and the data carried in the first symbol, if the occupied power value is 3 dB, the first terminal sends the first DMRS with 13 dBm and sends the data located at the same symbol as the first DMRS with 7 dBm after using the method of embodiments of the disclosure.

That is, in the case of not occupying the power, the sending power for sending the first DMRS on the first frequency resource is equal to the sending power for sending the data on the frequency resource other than the first frequency resource in the frequency resources corresponding to the first symbol. In the case of occupying the power, the sending power for sending the first DMRS on the first frequency resource is greater than the sending power for sending the data on the frequency resource other than the first frequency resource among the frequency resources corresponding to the first symbol. That is, the first sending power is greater than the remaining second sending power obtained after the at least part of the second sending power is occupied.

For example, the remaining second sending power equals to a difference between the initial sending power corresponding to another frequency resource and XdB. In some examples, the remaining second sending power may be 0. In other examples, the remaining second sending power is greater than 0.

In other examples, the terminal does not map data on the RE corresponding to the unoccupied CDM group(s) and does not send data on other frequency resource(s), i.e., there is no need to perform step 205.

At step 306, the network device receives the first DMRS.

After receiving the first DMRS, the network device performs channel estimation based on the first DMRS. Since the sending power for sending the first DMRS is increased, the corresponding receiving power at the network device side is also increased, so that the channel estimation can be performed accurately.

In embodiments of the disclosure, the first sending power configured for sending the first DMRS by the terminal on the first frequency resource occupies at least part of the second sending power on another frequency resource other than the first frequency resource among frequency resources corresponding to the first symbol, and the above another frequency resource other than the first frequency resource among frequency resources corresponding to the first symbol is not configured for send the second DMRS. In this case, the first sending power for sending the first DMRS is increased by occupying the second sending power on another other frequency resource, so that in the areas with poor coverage quality of the NR system, such as the coverage edge of the cell, the network device can receive the first DMRS sent by the terminal with the appropriate receiving power and use the first DMRS for accurate channel estimation, to improve the system performance.

Figure 9:
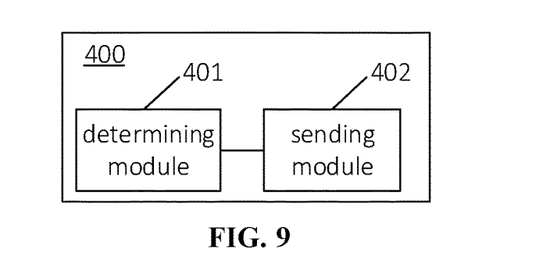
FIG. 9 is a schematic diagram illustrating an apparatus for sending a DMRS according to some embodiments.

FIG. 9 is a schematic diagram illustrating an apparatus for sending a DMRS according to some embodiments. The apparatus can implement the functions of the terminal in the above method embodiments, which can be implemented by hardware or by software executed by hardware. As illustrated in FIG. 9, the apparatus 400 includes: a determining module 401 and a sending module 402.

The determining module 401 is configured to determine a first sending power for sending a first DMRS on a first frequency resource based on control information from a network device, in which the first frequency resource is a frequency resource corresponding to a first CDM group among frequency resources corresponding to a first symbol, the first sending power occupies at least part of a second sending power on another frequency resource other than the first frequency resource among the frequency resources corresponding to the first symbol, and the another frequency resource is not configured for sending a second DMRS. The sending module 402 is configured to send the first DMRS on the first frequency resource based on the first sending power.

In a possible implementation, the sending module 402 is further configured to send data on frequency resources other than the first frequency resource among the frequency resources corresponding to the first symbol, based on a remaining second sending power obtained after the at least part of the second sending power is occupied.

In another possible implementation, the sending module 402 is further configured to send no data on frequency resources other than the first frequency resource among the frequency resources corresponding to the first symbol.

In some examples, the control information is configured to instruct the terminal to determine the first sending power to occupy the second sending power on the another frequency resource.

In some examples, the control information indicates a part of a plurality of CDM groups corresponding to the first symbol used for sending DMRS, in which the first CDM group belongs to the part of the plurality of CDM groups.

For example, the part of the plurality of CDM groups is one CDM group.

In some examples, the first sending power occupies XdB of the second sending power, and X is a default value or a configured value configured by the network device.

In some examples, for the DMRS type 1, the value of X is selected from 0.5, 1, 2, and 3, and for the DMRS type 2, the value of X is selected from 0.5, 1, 2, 3, and 4.77.

In some examples, the default value is a maximum value within a value range of the configured value.

In some examples, the control information includes the configured value.

In some examples, the first sending power is greater than a remaining second sending power obtained after the at least part of the second sending power is occupied.

Figure 10:
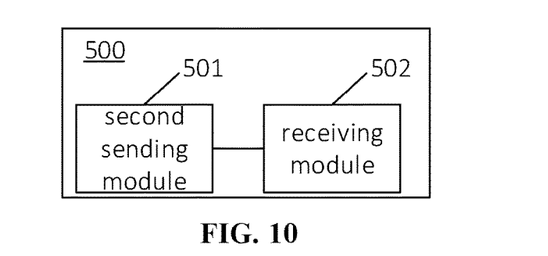
FIG. 10 is a schematic diagram illustrating an apparatus for receiving a DMRS according to some embodiments.

FIG. 10 is a schematic diagram illustrating an apparatus for receiving a DMRS according to some embodiments. The apparatus can implement the functions of the network device in the above method embodiments, which can be implemented by hardware, or by software executed by hardware. As illustrated in FIG. 10, the apparatus 500 includes: a second sending module 501 and a receiving module 502.

The second sending module 501 is configured to send control information. The receiving module 502 is configured to receive a first DMRS from a terminal. The first DMRS is sent by the terminal with a first sending power on a first frequency resource. The first sending power is determined by the terminal based on the control information. The first frequency resource is a frequency resource corresponding to a first CDM group among frequency resources corresponding to a first symbol. The first sending power occupies at least part of a second sending power on another frequency resource other than the first frequency resources among the frequency resources corresponding to the first symbol. The another frequency resources is not configured for sending a second DMRS.

In some examples, the control information is configured to instruct the terminal to determine the first sending power to occupy the second sending power on the another frequency resource.

In some examples, the control information indicates a part of a plurality of CDM groups corresponding to the first symbol configured for sending DMRS, in which the first CDM group belongs to the part of the plurality of CDM groups.

For example, the part of the plurality of CDM groups is one CDM group.

In some examples, the first sending power occupies XdB of the second sending power, and X is a default value or a configured value configured by the network device.

For example, for the DMRS type 1, the value of X is selected from 0.5, 1, 2, and 3, and for the DMRS type 2, the value of X is selected from 0.5, 1, 2, 3, and 4.77.

In some examples, the default value is a maximum value within a value range of the configured value.

In some examples, the control information includes the configured value.

In some examples, the first sending power is greater than a remaining second sending power obtained after the at least part of the second sending power is occupied.

Figure 11:
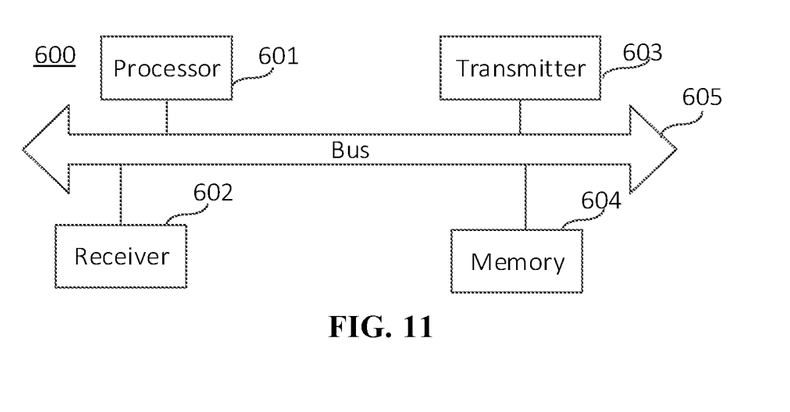
FIG. 11 is a block diagram illustrating a terminal according to some embodiments.

FIG. 11 is a block diagram illustrating a terminal 600 according to some embodiments. As illustrated in FIG. 11, the terminal 600 includes: a processor 601, a receiver 602, a transmitter 603, a memory 604, and a bus 605.

The processor 601 includes one or more processing cores, and the processor 601 performs various functional applications and information processing by running software programs and modules.

The receiver 602 and the transmitter 603 may be implemented as a communication component, which may be a communication chip.

The memory 604 is connected to the processor 601 via the bus 605.

The memory 604 is configured to store at least one instruction. The processor 601 is configured to execute the at least one instruction, to perform the method according to the embodiments of the disclosure.

In addition, the memory 604 can be implemented by any type of volatile or non-volatile storage device or a combination thereof. The volatile or non-volatile storage devices include, but are not limited to: disk or optical disks, Electrically Erasable Programmable Read-Only Memories (EEPROMs), Erasable Programmable Read-Only Memories (EPROMs), Static Random Access Memories (SRAMs), Read-Only Memories (ROMs), magnetic memories, flash memories, Programmable Read-Only Memories (PROMs).

In some embodiments, a computer readable storage medium is provided. The computer readable storage medium stores at least one instruction, at least one program segment, a code set or an instruction set. The at least one instruction, the at least one program segment, the code set or the instruction set are loaded and executed by the processor, to implement the method of sending a DMRS provided in each of the above method embodiments.

Figure 12:
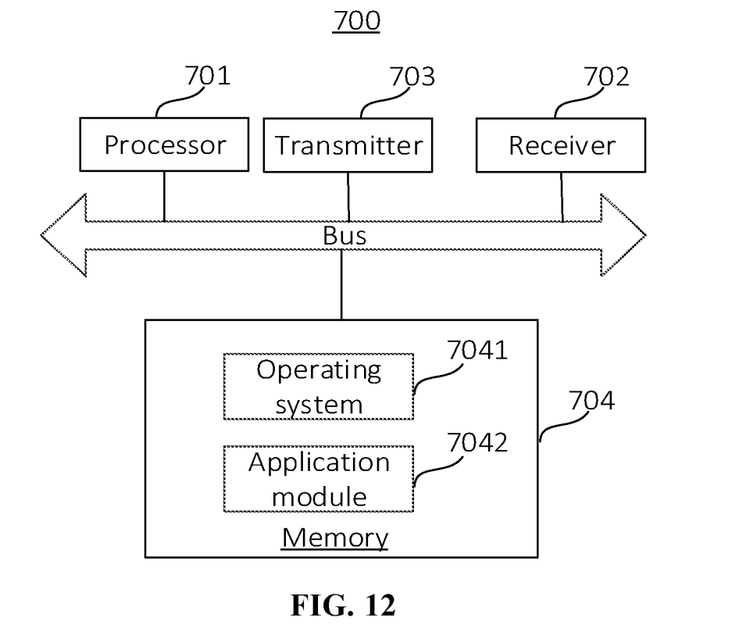
FIG. 12 is a block diagram illustrating a network device according to some embodiments.

FIG. 12 is a block diagram illustrating a network device 700 according to some embodiments. As illustrated in FIG. 12, the network device 700 may include: a processor 701, a receiver 702, a transmitter 703, and a memory 704. The receiver 702, the transmitter 703, and the memory 704 are each connected to the processor 701 via a bus.

The processor 701 includes one or more processing cores. The processor 701 executes the method performed by the network device according to embodiments of the disclosure by running software programs and modules. The memory 704 is used to store the software programs and modules. In detail, the memory 704 may store an operating system 7041, and an application program module 7042 required for at least one function. The receiver 702 is configured to receive communication data sent by other devices, and the transmitter 703 is configured to send communication data to other devices.

In the exemplary embodiments, a computer readable storage medium is provided. The computer readable storage medium stores at least one instruction, at least one program segment, a code set or an instruction set. The at least one instruction, the at least one program segment, the code set or the instruction set are loaded and executed by the processor, to implement the method of receiving a DMRS provided in each of the above method embodiments.

The embodiment of the disclosure also provides a communication system, including a terminal and a network device. The terminal is a terminal involved in the embodiments illustrated in FIG. 11. The network device is a network device involved in the embodiments illustrated in FIG. 12.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for sending a Demodulation Reference Signal (DMRS), performed by a terminal, the method comprising:
    determining a first sending power for sending a first DMRS on a first frequency resource based on control information from a network device, wherein the first frequency resource is a frequency resource correspond to a first Code Division Multiplexing (CDM) group among frequency resources correspond to a first symbol, the first sending power occupies at least part of a second sending power on a second frequency resource other than the first frequency resource among the frequency resources correspond to the first symbol, and the second frequency resource is not configured for sending a second DMRS; and
    sending the first DMRS on the first frequency resource based on the first sending power;
    wherein the first sending power occupies XdB of the second sending power, and X is a default value or a configured value configured by the network device; and wherein for DMRS type 1, a value of the X is selected from 0.5, 1, 2, and 3, and for DMRS type 2, a value of the X is selected from 0.5, 1, 2, 3, and 4.77.

2. The method of claim 1, wherein the control information is configured to instruct the terminal to determine the first sending power to occupy the second sending power on the second frequency resource.

3. The method of claim 1, wherein the control information indicates a part of a plurality of CDM groups corresponding to the first symbol configured for sending DMRS, wherein the first CDM group belongs to the part of the plurality of CDM groups.

4. The method of claim 3, wherein the part of the plurality of CDM groups is one CDM group.

5. The method of claim 1, wherein the default value is a maximum value within a value range of the configured value.

6. The method of claim 1, wherein the control information comprises the configured value.

7. The method of claim 1, further comprising:
    sending data on frequency resources other than the first frequency resource among the frequency resources corresponding to the first symbol based on a remaining second sending power obtained after the at least part of the second sending power is occupied.

8. The method of claim 1, further comprising
sending no data on frequency resources other than the first frequency resources among the frequency resources corresponding to the first symbol.

9. The method of claim 1, wherein the first sending power is greater than a remaining second sending power obtained after the at least part of the second sending power is occupied.

10. A method for receiving a Demodulation Reference Signal (DMRS), comprising:
sending control information; and
receiving a first DMRS at a network device from a terminal;
wherein the first DMRS is sent by the terminal with a first sending power on a first frequency resource; the first sending power is determined by the terminal based on the control information; the first frequency resource is a frequency resource correspond to a first Code Division Multiplexing (CDM) group among frequency resources corresponding to a first symbol; the first sending power occupies at least part of second sending power on a second frequency resource other than the first frequency resource among the frequency resources corresponding to the first symbol; and the second frequency resource is not configured for sending a second DMRS,
wherein the first sending power occupies XdB of the second sending power, and X is a default value or a configured value configured by the network device; and
wherein for DMRS type 1, a value of the X is selected from 0.5, 1, 2, and 3, and for DMRS type 2, a value of the X is selected from 0.5, 1, 2, 3, and 4.77.

11. The method of claim 10, wherein the control information is configured to instruct the terminal to determine the first sending power to occupy the second sending power on the second frequency resource.

12. The method of claim 10, wherein the control information is configured to indicate a part of a plurality of CDM groups corresponding to the first symbol configured for sending DMRS, and the first CDM group belongs to the part of the plurality of CDM groups.

13. The method of claim 10, wherein the default value is a maximum value within a value range of the configured value.

14. The method of claim 10, wherein the first sending power is greater than a remaining second sending power obtained after the at least part of the second sending power is occupied.

15. A network device, comprising:
a processor; and
a memory for storing instructions executable by the processor;
wherein the processor is configured to load and execute the instructions to implement the method of claim 10.

16. A terminal, comprising:
a processor; and
a memory for storing instructions executable by the processor;
wherein the processor is configured to:
determine a first sending power for sending a first DMRS on a first frequency resource based on control information from a network device, wherein the first frequency resource is a frequency resource corresponding to a first Code Division Multiplexing (CDM) group among frequency resources corresponding to a first symbol, the first sending power occupies at least part of a second sending power on a second frequency resource other than the first frequency resource among the frequency resources corresponding to the first symbol, and the second frequency resource is not configured for sending a second DMRS; and
send the first DMRS on the first frequency resource based on the first sending power;
wherein the first sending power occupies XdB of the second sending power, and X is a default value or a configured value configured by the network device; and
wherein for DMRS type 1, a value of the X is selected from 0.5, 1, 2, and 3, and for DMRS type 2, a value of the X is selected from 0.5, 1, 2, 3, and 4.77.

* * * * *